(12) United States Patent
Kato

(10) Patent No.: US 10,814,756 B2
(45) Date of Patent: Oct. 27, 2020

(54) VEHICLE SEAT

(71) Applicant: TOYOTA BOSHOKU KABUSHIKI KAISHA, Aichi-ken (JP)

(72) Inventor: Yasuhiro Kato, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/250,253

(22) Filed: Jan. 17, 2019

(65) Prior Publication Data

US 2019/0217757 A1   Jul. 18, 2019

(30) Foreign Application Priority Data

Jan. 18, 2018   (JP) ................................. 2018-006375

(51) Int. Cl.
*B60N 2/68* (2006.01)
*B60N 2/20* (2006.01)

(52) U.S. Cl.
CPC ............... *B60N 2/682* (2013.01); *B60N 2/20* (2013.01)

(58) Field of Classification Search
CPC ...... B60N 2/682; B60N 2/68; E04H 12/2292; E02D 5/60
USPC .................................. 248/188, 188.1, 188.9
See application file for complete search history.

(56) References Cited

U.S. PATENT DOCUMENTS

| | | | | |
|---|---|---|---|---|
| 4,644,713 A * | 2/1987 | Lehman | ............... | E04H 12/2215 52/165 |
| 4,767,105 A * | 8/1988 | Caspers | ................ | G11B 33/02 267/140 |
| 5,353,716 A * | 10/1994 | Wilbert | ..................... | A47B 7/02 108/150 |
| 5,575,533 A * | 11/1996 | Glance | ................... | B60N 2/682 297/232 |
| 5,826,907 A * | 10/1998 | Saito | .................... | B60R 13/0206 280/808 |
| 6,347,836 B1 * | 2/2002 | Hayotte | .................. | B60N 2/20 297/378.1 |
| 6,352,311 B1 * | 3/2002 | Hayotte | ................. | B60N 2/682 29/421.1 |
| 6,880,709 B2 * | 4/2005 | Chen | ....................... | A47B 81/00 211/60.1 |
| 7,574,966 B1 * | 8/2009 | Stephens | ............... | E04H 1/1255 108/156 |

(Continued)

FOREIGN PATENT DOCUMENTS

| | | |
|---|---|---|
| DE | 102009053460 B4 * | 5/2019 |
| JP | 10-042995 | 2/1998 |

(Continued)

*Primary Examiner* — Timothy J Brindley
(74) *Attorney, Agent, or Firm* — Greenblum & Bernstein, P.L.C.

(57) ABSTRACT

A vehicle seat including: a frame member whose sectional shape includes a pair of facing portions extending in a specific direction; and a cap attached to terminals, in the specific direction, of the pair of facing portions and extending between the terminals of the pair of facing portions, wherein the cap includes a pair of pressing portions abutting on the terminals of the pair of facing portions from at least one of an inner peripheral side or an outer peripheral side and configured to suppress deformation of each of the terminals toward a side facing another of the terminals or a side opposite thereto.

8 Claims, 13 Drawing Sheets

(56) References Cited

U.S. PATENT DOCUMENTS

| | | | | |
|---|---|---|---|---|
| 7,837,161 B2* | 11/2010 | Chase | ............ | A47B 91/06 |
| | | | | 16/42 T |
| 8,132,862 B2* | 3/2012 | Yamada | ............ | B60N 2/688 |
| | | | | 297/216.13 |
| 9,688,169 B2* | 6/2017 | Contorbia | ............ | B60N 2/36 |
| 2002/0135222 A1* | 9/2002 | Matsunuma | ............ | B60N 2/682 |
| | | | | 297/483 |
| 2007/0033896 A1* | 2/2007 | Wasiukiewicz | ............ | E04H 12/2292 |
| | | | | 52/834 |

FOREIGN PATENT DOCUMENTS

| | | | | |
|---|---|---|---|---|
| JP | 2012197080 A | * | 10/2012 | |
| WO | WO-2015168680 A1 | * | 11/2015 | ............ B60N 2/686 |

\* cited by examiner

VEHICLE SEAT

CROSS-REFERENCE TO RELATED APPLICATIONS

This application claims priority from Japanese Patent Application No. 2018-006375 filed on Jan. 18, 2018, the entire contents of which are incorporated herein by reference.

TECHNICAL FIELD

The disclosure relates to a vehicle seat. In particular, the disclosure relates to a vehicle seat including a frame member whose sectional shape has a pair of facing portions extending in a specific direction.

BACKGROUND

A frame structure of a vehicle seat in which a seat frame is configured by a square pipe is known (JP-A-H10-42995).

In the related prior art, a middle portion in the lengthwise direction of the square pipe is hard to be crushed due to the closed cross section, but the opening portion at the terminal thereof is liable to be crushed.

SUMMARY

An object to be achieved by the disclosure is to appropriately prevent a terminal of a frame member of a vehicle seat from being crushed.

According to an aspect of the disclosure, there is provided a vehicle seat including: a frame member whose sectional shape includes a pair of facing portions extending in a specific direction; and a cap attached to terminals, in the specific direction, of the pair of facing portions and extending between the terminals of the pair of facing portions, wherein the cap includes a pair of pressing portions abutting on the terminals of the pair of facing portions from at least one of an inner peripheral side or an outer peripheral side and configured to suppress deformation of each of the terminals toward a side facing another of the terminals or a side opposite thereto.

Accordingly, the deformation of the terminals, in the specific direction, of the pair of facing portions of the frame member toward the side facing the other terminal or the opposite side can be suppressed by the pressing portion of the cap, so that the crushing of the terminals of the frame member can be prevented.

According to another aspect of the disclosure, there is provided a vehicle seat including: a frame member having an opened end, the frame member including: a first portion extending in a longitudinal direction and including a first longitudinal end portion configuring the opened end; and second portion extending in the longitudinal direction and including a second longitudinal end portion configuring the opened end, the second longitudinal end portion facing the first longitudinal end portion; and a cap attached to the first longitudinal end portion and the second longitudinal end portion so as to cover the opened end, wherein the cap includes a first abutting portion abutting on the first longitudinal end portion and a second abutting portion abutting on the second longitudinal end portion, the first abutting portion and the second abutting portion configured to suppress deformation of the first longitudinal end portion and the second longitudinal end portion.

DETAILED DESCRIPTION

Hereinafter, an embodiment for carrying out the disclosure will be described with reference to the drawings.

First Embodiment

<Basic Configuration of Seat 1>

First, a configuration of a seat 1 according to a first embodiment will be described with reference to FIGS. 1 to 13. Meanwhile, in the following description, the directions such as a front and rear direction, an upper and lower direction and a right and left direction refer to the respective directions as indicated in each of the drawings. Further, the "seat width direction" refers to the right and left direction of the seat 1, and the "seat front and rear direction" refers to the front and rear direction of the seat 1.

Figure 1:
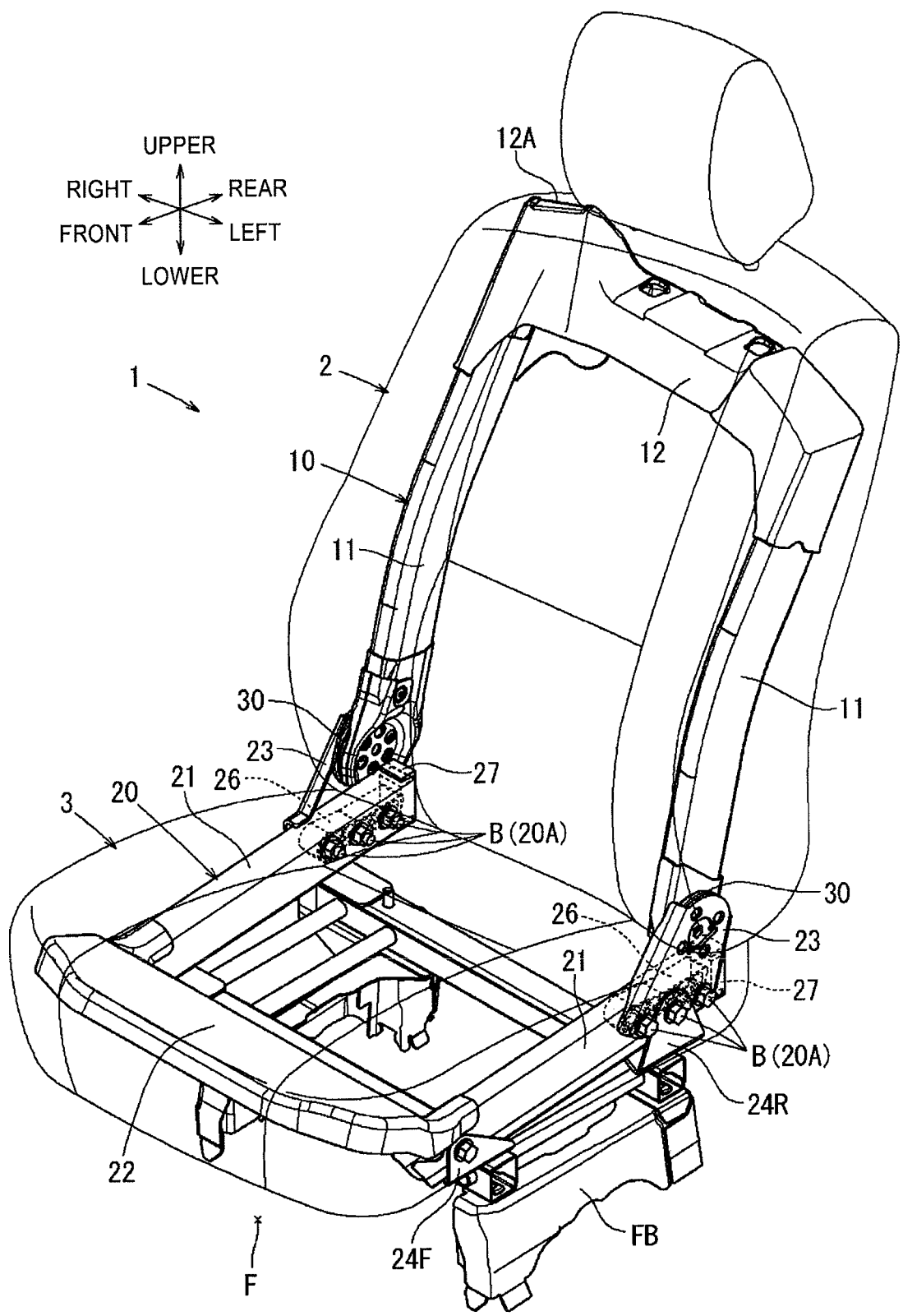
FIG. 1 is a perspective view showing a schematic configuration of a vehicle seat according to a first embodiment.
Figure 10:
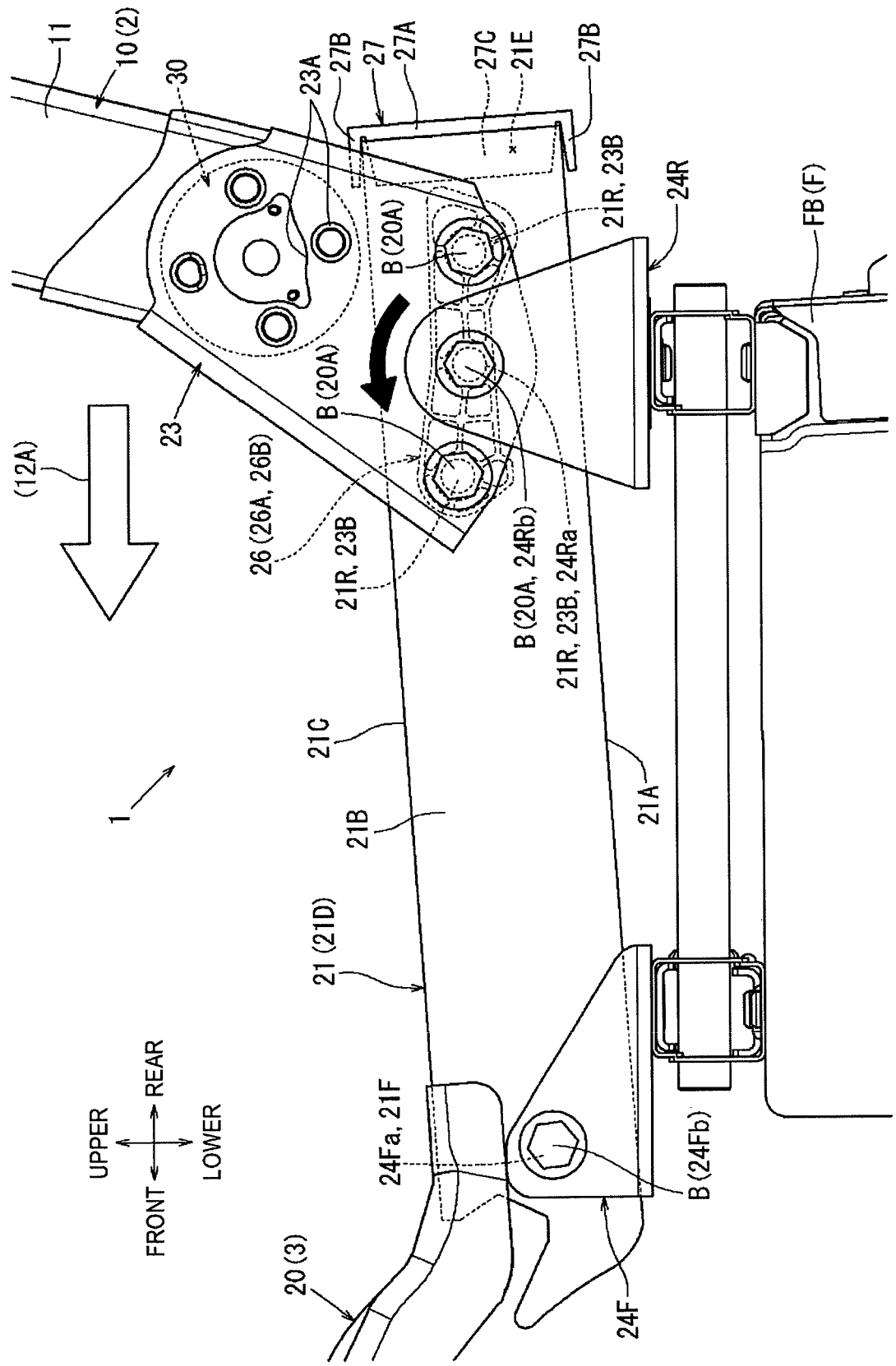
FIG. 10 is a side view showing the load transmission when a large load in a forward direction is input to a seat back from FIG. 4.

As shown in FIG. 1, the seat 1 of the present embodiment is configured as a right seat of an automobile. The seat 1 includes a seat back 2 serving as a backrest of a seated person and a seat cushion 3 serving as a seating part. The seat 1 is configured as a so-called belt-in seat. In the seat 1, a retractor of a seat belt (not shown) is incorporated in a back portion of the seat back 2, and a pull-out port 12A of the seat belt is set in a shoulder mouth portion on the right side of the seat back 2. With this configuration, as shown in FIG. 10, when a front collision of a vehicle occurs, a tensile load toward the front side due to the seat belt (not shown) receiving a body of a seated person is applied to the shoulder mouth portion of the seat back 2 where the pull-out port 12A is set.

As shown in FIG. 1, lower end portions on both right and left sides of the seat back 2 are respectively connected to rear end portions on both right and left sides of the seat cushion 3 via recliners 30 serving as a seat reclining adjustment mechanism in a state where a backrest angle can be adjusted. The seat cushion 3 is connected to a base FB installed on a vehicle floor F in a raised state in a height direction via a pair of front and rear legs 24F, 24R (to be described later) on the right and left sides, respectively. Meanwhile, a specific configuration of each recliner 30 described above is substantially the same as a known configuration disclosed in a literature such as JP-A-2015-029635, and a detailed description thereof will be omitted.

<Configuration of Seat Back 2>

Specifically, the seat back 2 mainly includes a metallic back frame 10 serving as a framework of the seat back, an urethane foam back pad (not shown) set in the front portion of the back frame 10 and elastically receiving the backrest load of the seated person, and a fabric back cover (not shown) covered on the entire surface of the back pad and forming a design surface of the seat back 2.

The back frame 10 has a structure assembled into a substantially inverted U shape in a front view and includes vertically elongated side frames 11 serving as a side framework on both right and left sides of the seat back 2, and an upper frame 12 integrally bridged between the upper portions of the side frames 11 and serving as an upper framework of the seat back 2. Further, although not shown, a reinforcing material for enhancing the structural strength of the back frame 10 is integrally bridged between the side frames 11 of the back frame 10.

Furthermore, a contour mat (not shown) for elastically supporting the central portion of the back pad (not shown) in a planar shape from the rear side is bridged between the upper frame 12 of the back frame 10 and the reinforcing material (not shown). Further, the pull-out port 12A of the seat belt is set in the shoulder mouth portion on the right side of the upper frame 12.

<Configuration of Seat Cushion 3>

Similar to the seat back 2, the seat cushion 3 mainly includes a metallic cushion frame 20 serving as a framework of the seat cushion, an urethane foam cushion pad (not shown) set in the upper portion of the cushion frame 20 and elastically receiving the load of the seated person, and a fabric cushion cover (not shown) covered on the entire surface of the cushion pad and forming a design surface of the seat cushion 3.

The cushion frame 20 has a structure assembled into a substantially U shape in a plan view and includes lower arms 21 serving as a side framework on both right and left sides of the seat cushion 3 and extending elongated in a seat front and rear direction, and a front panel 22 integrally bridged between the front portions of the lower arms 21 and serving as a front framework of the seat cushion 3. Further, although not shown, a reinforcing material for enhancing the structural strength of the cushion frame 20 is integrally bridged between the lower arms 21 of the cushion frame 20. Furthermore, a metallic cushion pan (not shown) for elastically supporting the central portion of the cushion pad (not shown) in a planar shape from the lower side is bridged between the front panel 22 of the cushion frame 20 and the reinforcing material (not shown). Here, each of the lower arms 21 described above corresponds to the "frame member" in the disclosure.

A reclining plate 23 is connected to a lower end portion of the side frame 11 on each side of the seat back 2 via the recliner 30 and joined to a rear end portion of each lower arm 21 of the cushion frame 20, respectively. These reclining plates 23 are made of a steel plate thicker than each lower arm 21 and are configured to have a high structural strength capable of strongly receiving loads such as bending and torsion input from the seat back 2 via the recliner 30 on each side. The cushion frame 20 is connected to the base FB installed on the vehicle floor F in a raised state via a pair of front and rear legs 24F, 24R on the right and left sides, respectively.

Figure 2:
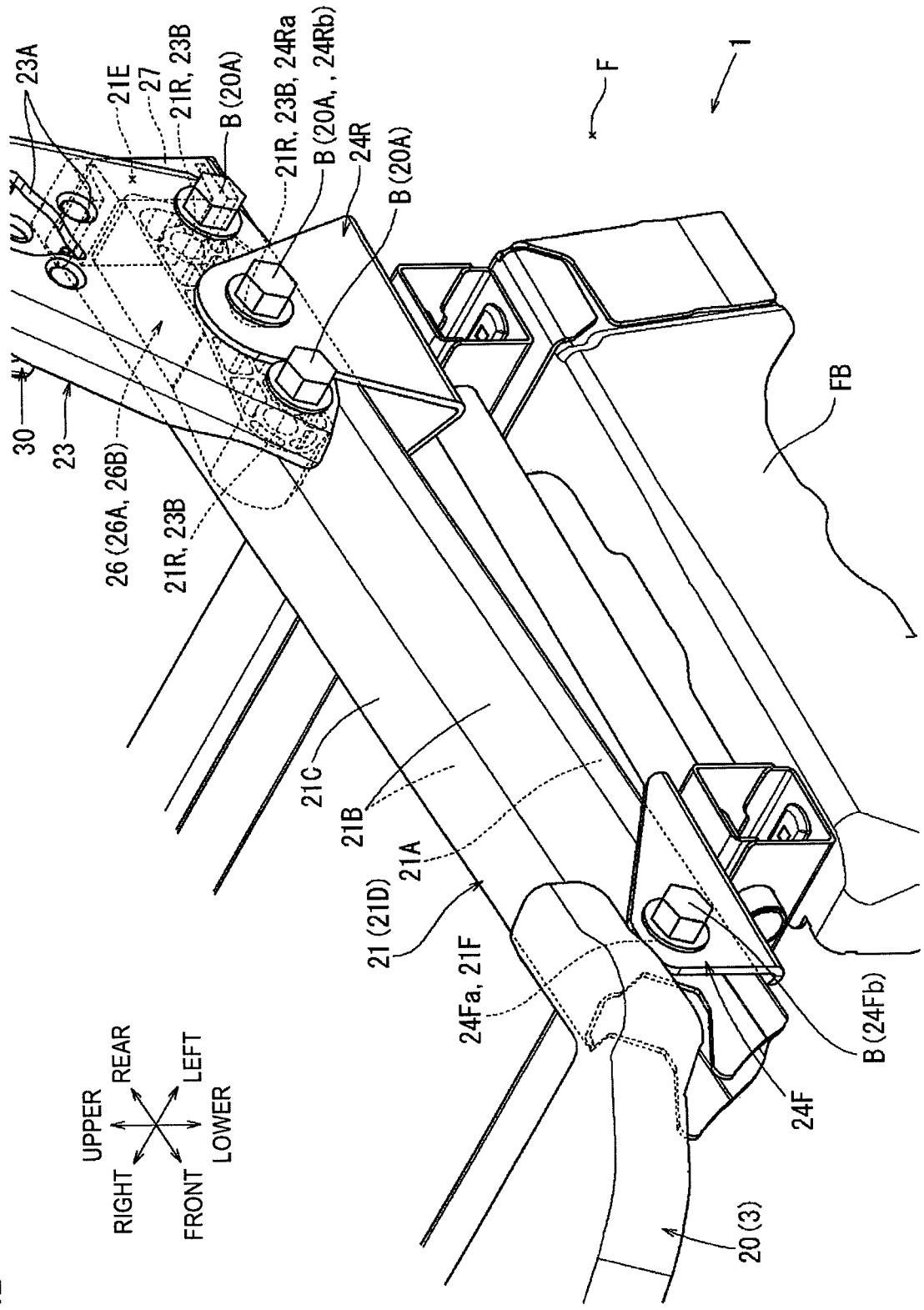
FIG. 2 is an enlarged perspective view of a main part of FIG. 1.
Figure 3:
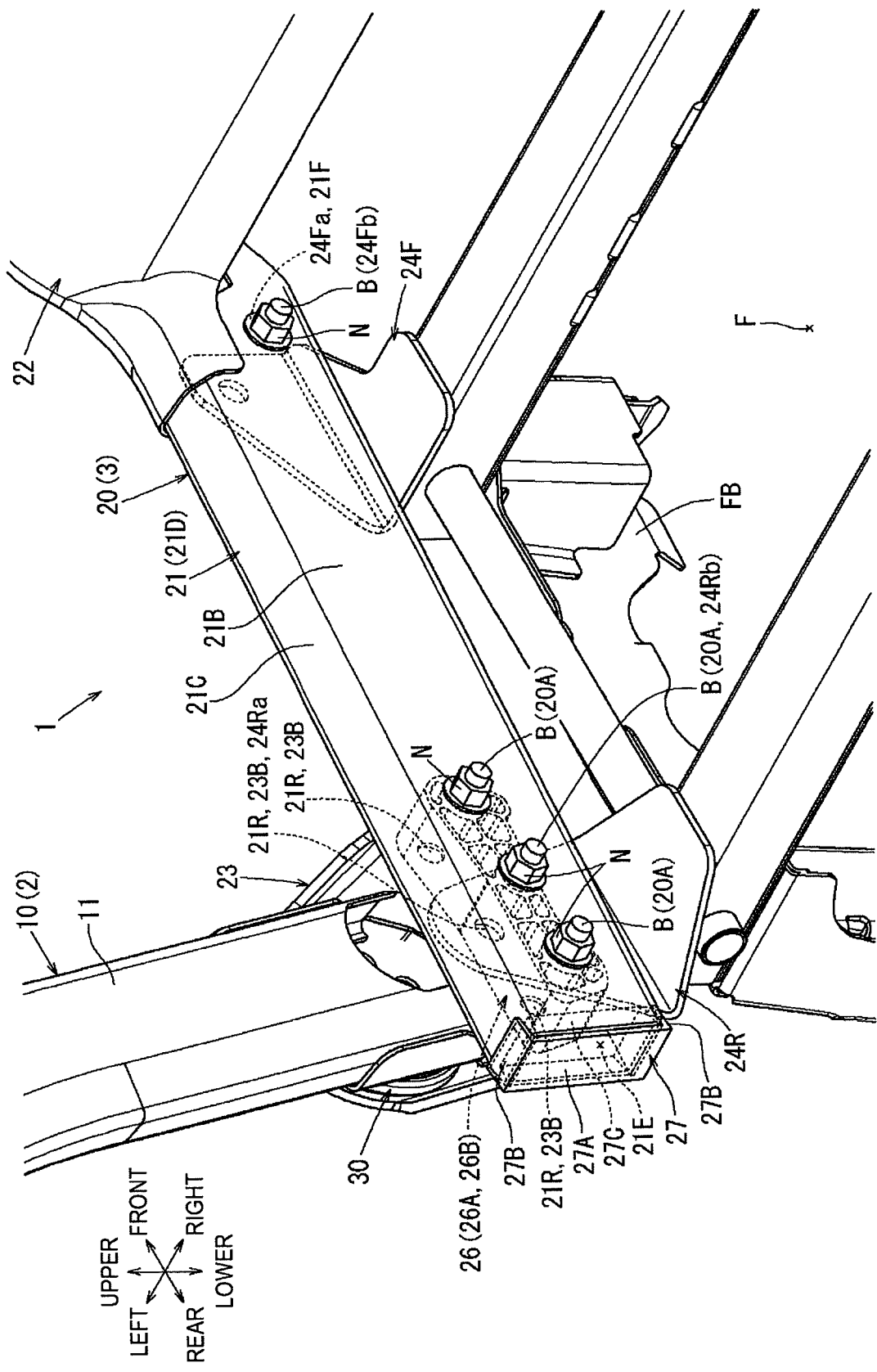
FIG. 3 is an enlarged perspective view of FIG. 2 as viewed from the opposite side.

As shown in FIG. 2, the coupling between each reclining plate 23 and each lower arm 21 is performed by fastening a plurality of bolts B inserted therethrough in the seat width direction, respectively (bolt fastening portion 20A). In each of the bolt fastening portions 20A between the reclining plates 23 and the lower arms 21, a collar body 26 which collectively has a plurality of collar portions 26A is provided in a closed sectional portion 21D of each lower arm 21. Each of the plurality of collar portions 26 is provided with a through-hole 26B through which each bolt B passes.

Figure 6:
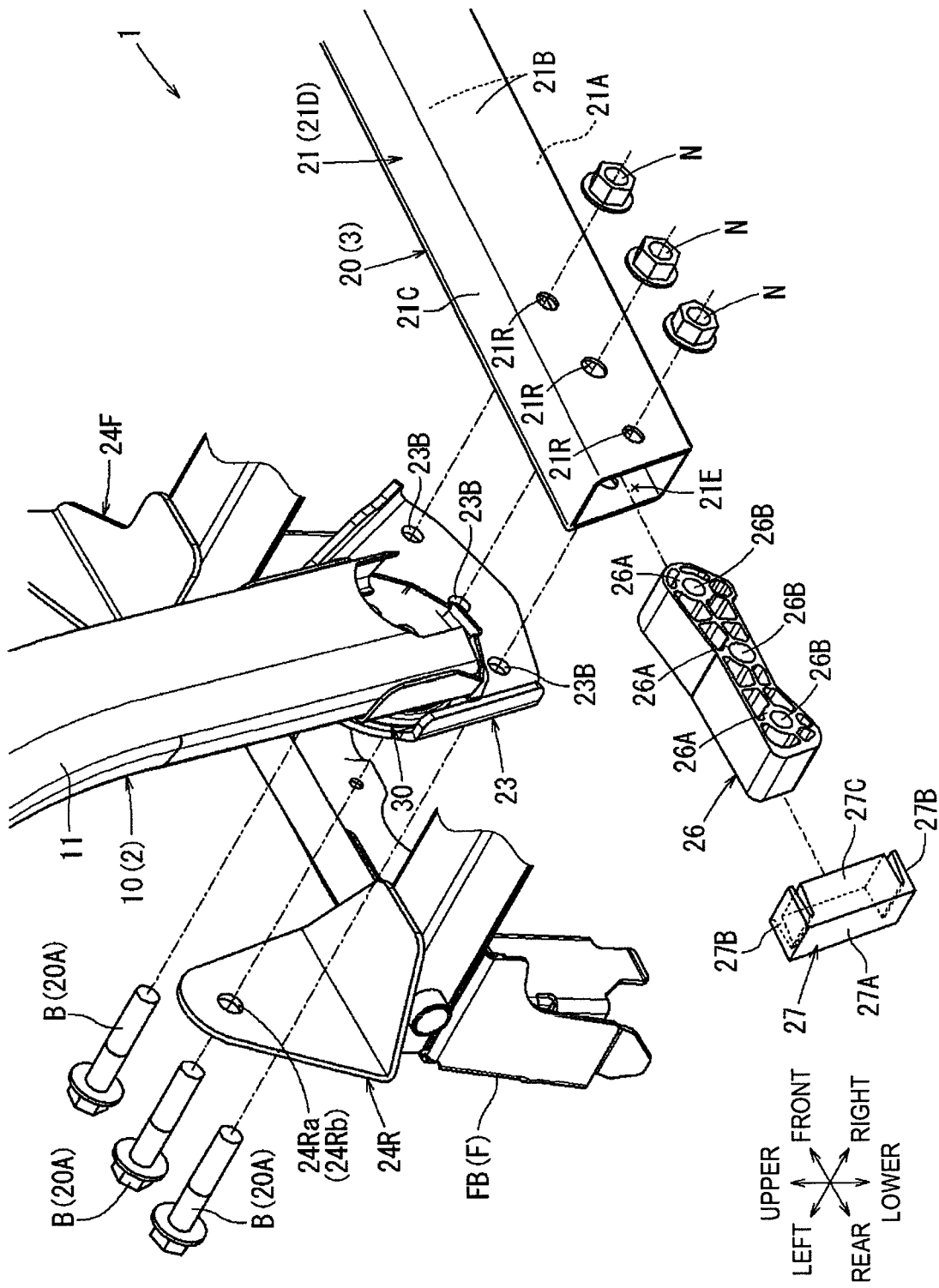
FIG. 6 is an exploded perspective view of FIG. 3.
Figure 7:
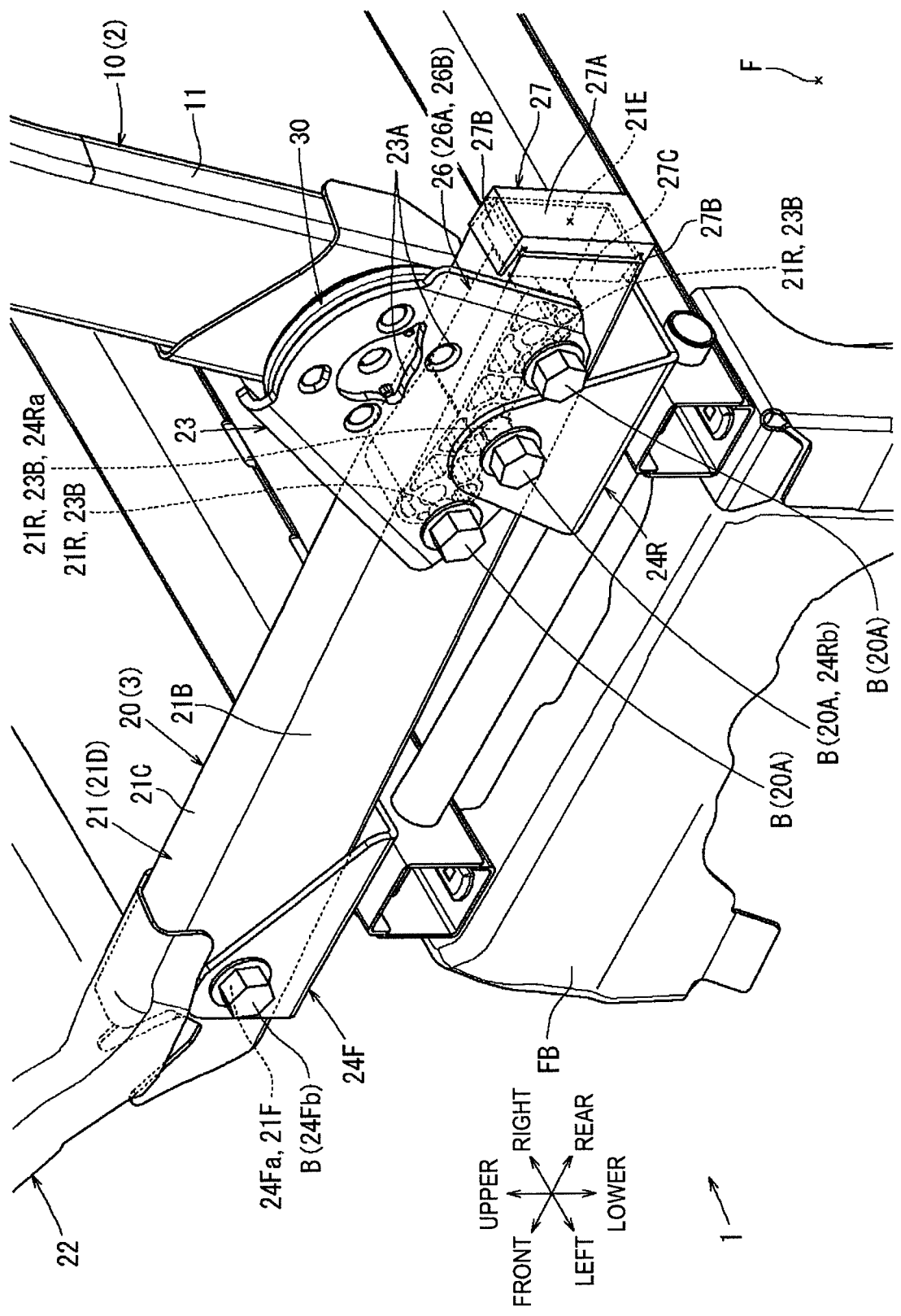
FIG. 7 is a perspective view of FIG. 2 as viewed from the rear side.
Figure 8:
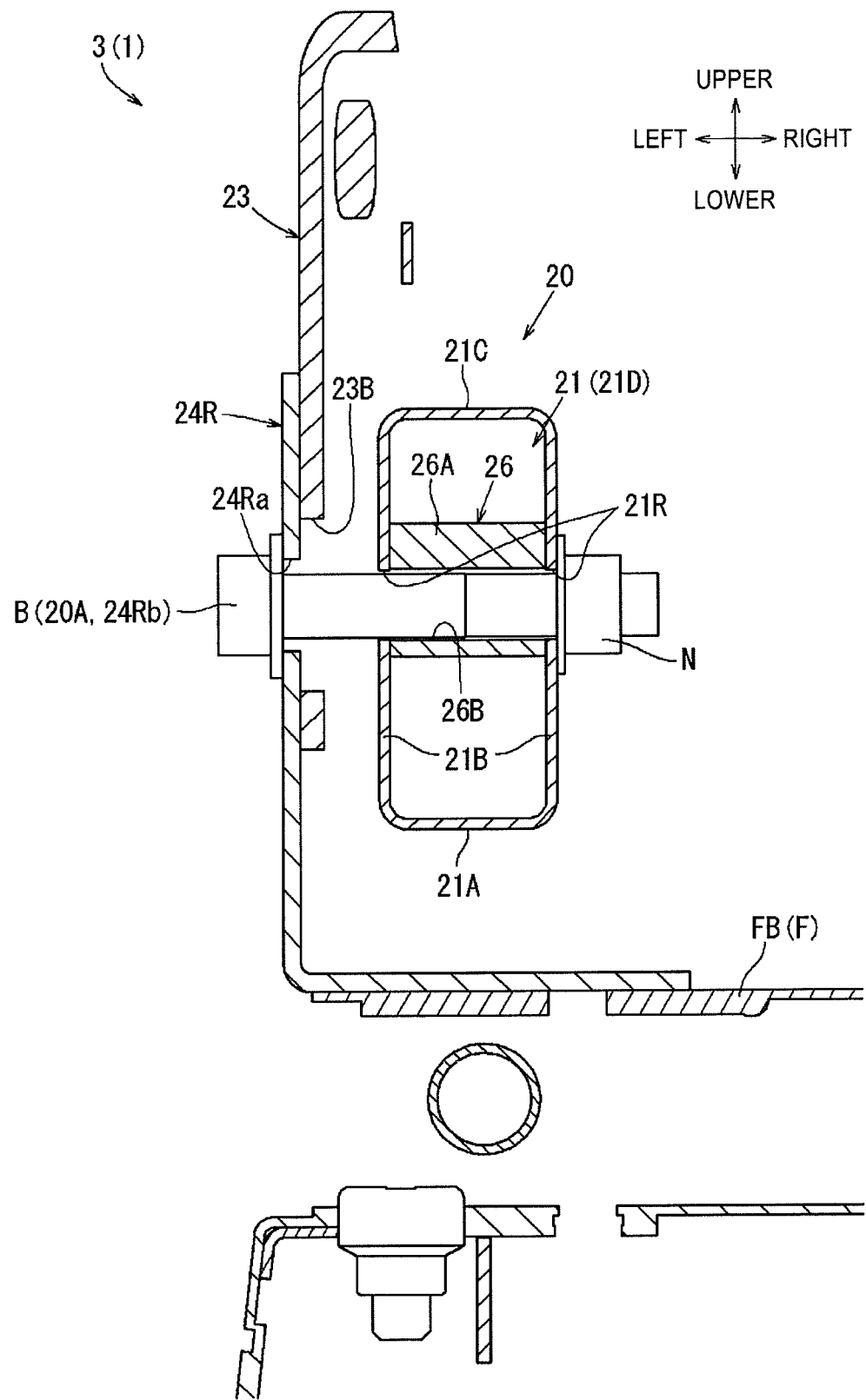
FIG. 8 is a sectional view taken along the line VIII-VIII in FIG. 4.
Figure 9:
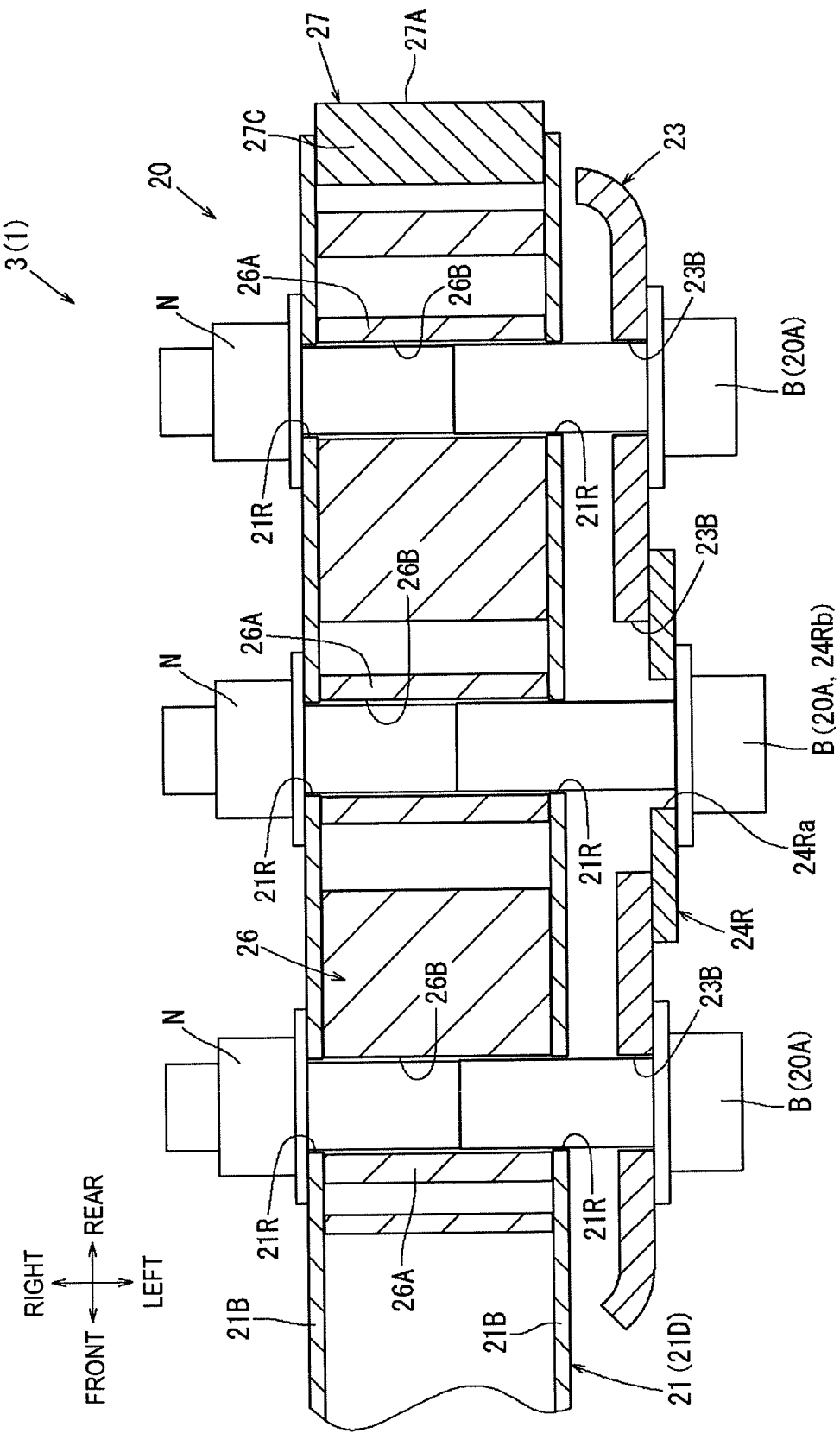
FIG. 9 is a sectional view taken along the line IX-IX in FIG. 4.

As shown in FIGS. 6 and 7, each of the collar bodies 26 is set by being inserted into the closed sectional portion 21D of each lower arm 21 formed by a square pipe material having a substantially rectangular section from a rear opening portion 21E. Each of the collar bodies 26 collectively has a plurality of through-holes 26B through which the bolts B are passed. Therefore, it is possible to conveniently set the collar portions 26A collectively without individually setting the collar portion 26A. Further, the loads such as bending and torsion transmitted from the respective bolts B passed through the respective through-holes 26B can be widely dispersed in the collar body 26 having an integral structure and can be transmitted to the lower arm 21 on each side.

Hereinafter, a specific configuration of each part of the cushion frame 20 will be described in detail. That is, as shown in FIGS. 2 to 7, each lower arm 21 is formed of a square pipe material which has a substantially rectangular vertically-elongated hollow sectional shape and which extends in a straight shape in the seat front and rear direction. Specifically, each lower arm 21 is formed of an extruded aluminum material. Each lower arm 21 has the constant sectional shape described above and is formed to extend in the straight shape in the seat front and rear direction.

Figure 4:
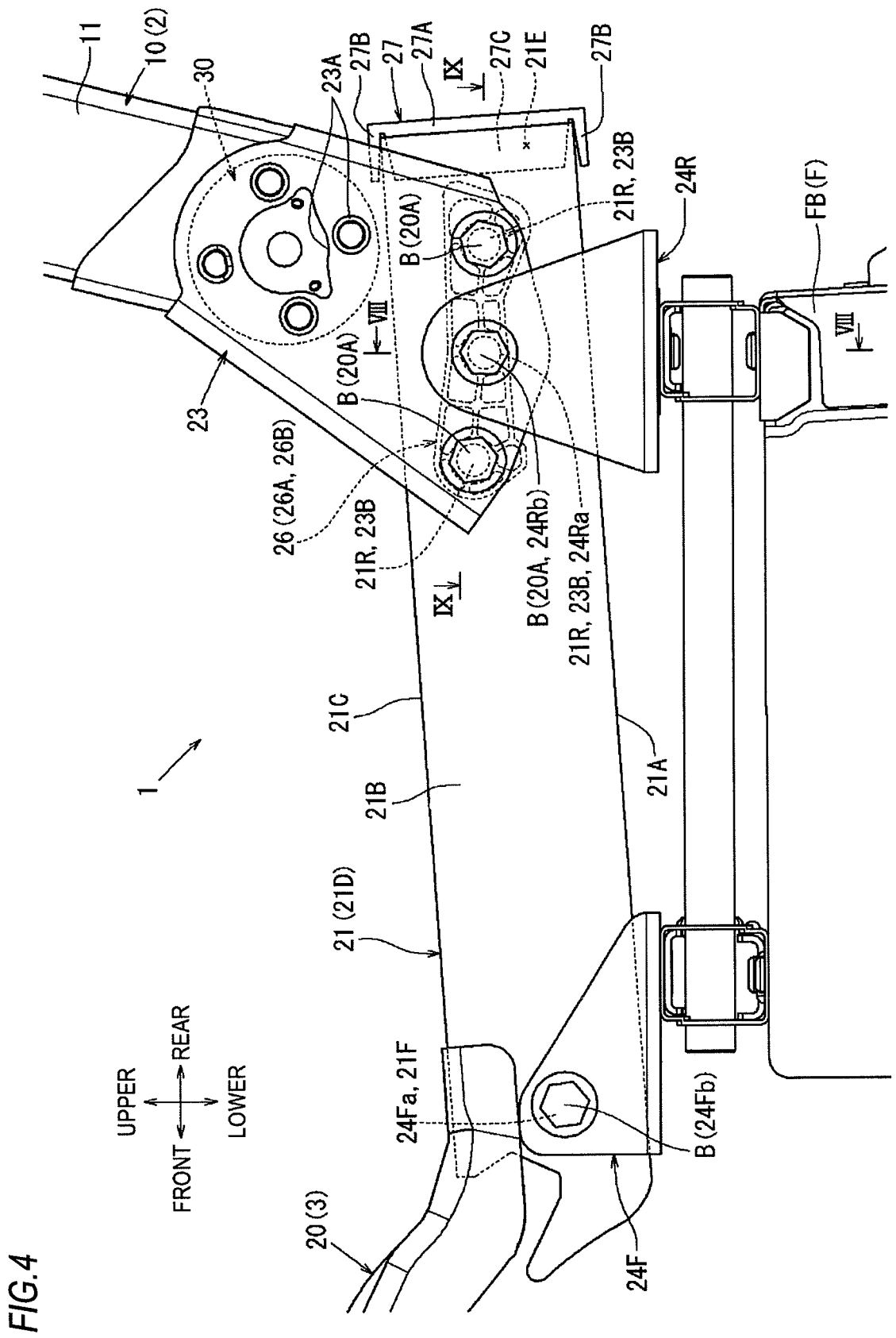
FIG. 4 is a side view of FIG. 2.
Figure 5:
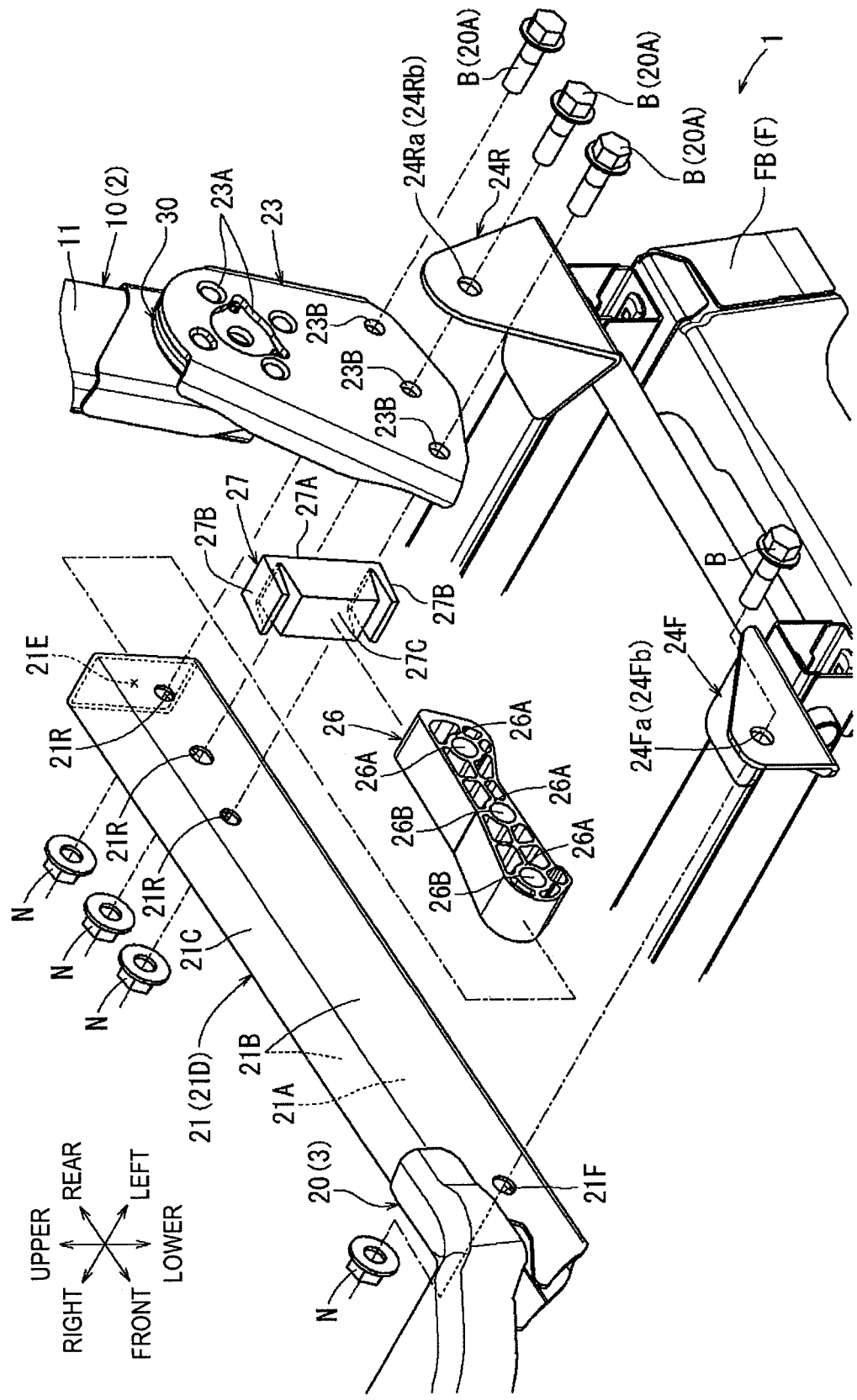
FIG. 5 is an exploded perspective view of FIG. 2.

As shown in FIG. 2 and FIGS. 4 to 6, each reclining plate 23 is formed of a thick steel plate material cut into a substantially triangular shape in a side view. As shown in FIG. 5, fitting through-holes 23A which are fitted with the outer portion of each recliner 30 are formed on the upper region of each reclining plate 23. Further, round holes 23B are formed at three positions in the seat front and rear direction on the lower region of each reclining plate 23. The round holes 23B are aligned with three round holes 21R formed at a rear region of each lower arm 21 and penetrating in the seat width direction from the outside in the seat width direction. The bolts B are inserted and fastened through the round holes 23B and the round holes 21R.

The outer portion of each recliner 30 is fitted into the fitting holes 23A before each reclining plate 23 is joined with each lower arm 21, so that each reclining plate 23 is integrally joined with each recliner 30 by welding. With this coupling, each reclining plate 23 is brought into a fastening operation process with each lower arm 21 by the bolts B as a state of being attached to the back frame 10 via each recliner 30.

Then, in the above-described fastening operation process, in a state where the reclining plates 23 are integrated with each other via the back frame 10, each reclining plate 23 is set so that the round holes 23B are aligned with the corresponding round holes 21R of each lower arm 21 from the outside in the seat width direction, and the bolts B are inserted and fastened so as to penetrate the aligned round holes 23B, 21R from the outside in the seat width direction (bolt fastening portion 20A).

At that time, among three bolts B inserted through each reclining plate 23 and each lower arm 21, the bolt B inserted at the center is also inserted into a round hole 24Ra formed in an upper end portion of each rear leg 24R, and each rear leg 24R is also fastened to each reclining plate 23 and each lower arm 21 in a state of being fastened together (pin joining portion 24Rb). With this fastening, each rear leg 24R is superimposed on the outer portion of each reclining plate 23 in the seat width direction and is integrally connected to each reclining plate 23 and each lower arm 21 (see FIG. 9).

Each front leg 24F is set so that a round hole 24Fa formed at the upper end portion thereof is aligned with a round hole 21F formed in the front portion of each lower arm 21 and penetrating in the seat width direction from the outside in the seat width direction, and the bolt B is inserted and fastened so as to penetrate the aligned round holes 24Fa, 21F from the outside in the seat width direction. In this way, each front leg 24F is superimposed on the outer portion of the lower arm 21 on each side in the seat width direction and is integrally connected to each lower arm 21 (pin joining portion 24Fb).

As shown in FIGS. 1 and 4, each front leg 24F and each rear leg 24R described above are provided as a state where lower ends thereof are integrally joined to the base FB installed on the vehicle floor F. For example, due to a seat belt (not shown) receiving a body of a seated person when a front collision of a vehicle occurs, a load of bending moment in the forward turn direction around a supporting point on the lower end side is input to the seat back 2. With the above coupling, as shown in FIG. 10, the cushion frame 20 is configured such that the load of bending moment is transmitted, as a rotational force around the pin joining portion 24Rb serving as a connection point between each reclining plate 23 and each rear leg 24R by the bolts B, along the lower arm 21 on each side and transmitted to a support structure by the front legs 24F. With this transmission, the load of bending moment transmitted from the reclining plates 23 to the lower arms 21 are appropriately dispersed and received over a wide range of the lower arms 21.

As shown in FIGS. 6 and 7, each collar body 26 is inserted into the closed sectional portion 21D of each lower arm 21 from the opening portion on the rear end side, and the corresponding through-holes 26B formed to penetrate through each collar portion 26A are set to be aligned with the round holes 21R formed to penetrate through the both side surface portions 21B of each lower arm 21. Each collar body 26 is configured as a single component having a constant sectional shape in the seat width direction which is the penetration direction of each through-hole 26B. Specifically, each collar body 26 is formed of an aluminum material extruded to have a constant sectional shape in the seat width direction. Each collar body 26 is configured as a single component in which the through-holes 26B are also formed to have a constant sectional shape in the seat width direction by the above extrusion molding.

Each collar body 26 is set in the closed sectional portion 21D of each lower arm 21 as described above, and then, as shown in FIGS. 8 and 9, the bolts B are inserted through the through-holes 26B of each collar body 26. In this way, the attachment position of each collar body 26 to each lower arm 21 is fixed via the bolts B. Further, the bolts B passed through each collar body 26 are inserted through each lower arm 21 and fastened with nuts N at its tip ends. In this way, each collar body 26 supports the both side surface portions 21B from the inside so that the both side surface portions 21B of each lower arm 21 are not crushed by an axial compressive force generated between heads of the bolts B and the nuts N.

(Configuration of Cap 27)

Figure 11:
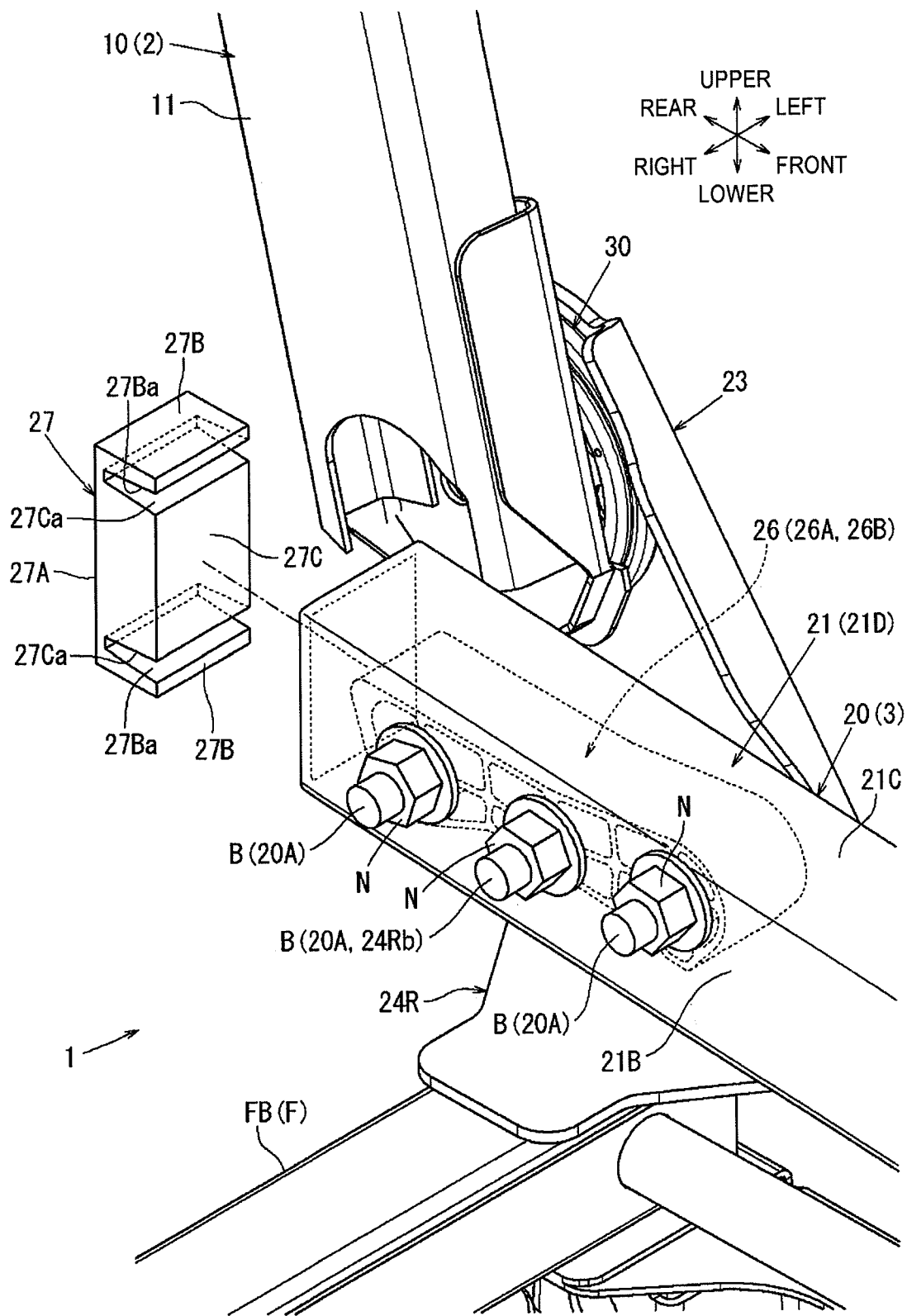
FIG. 11 is an enlarged exploded perspective view showing an attachment portion of a cap.
Figure 12:
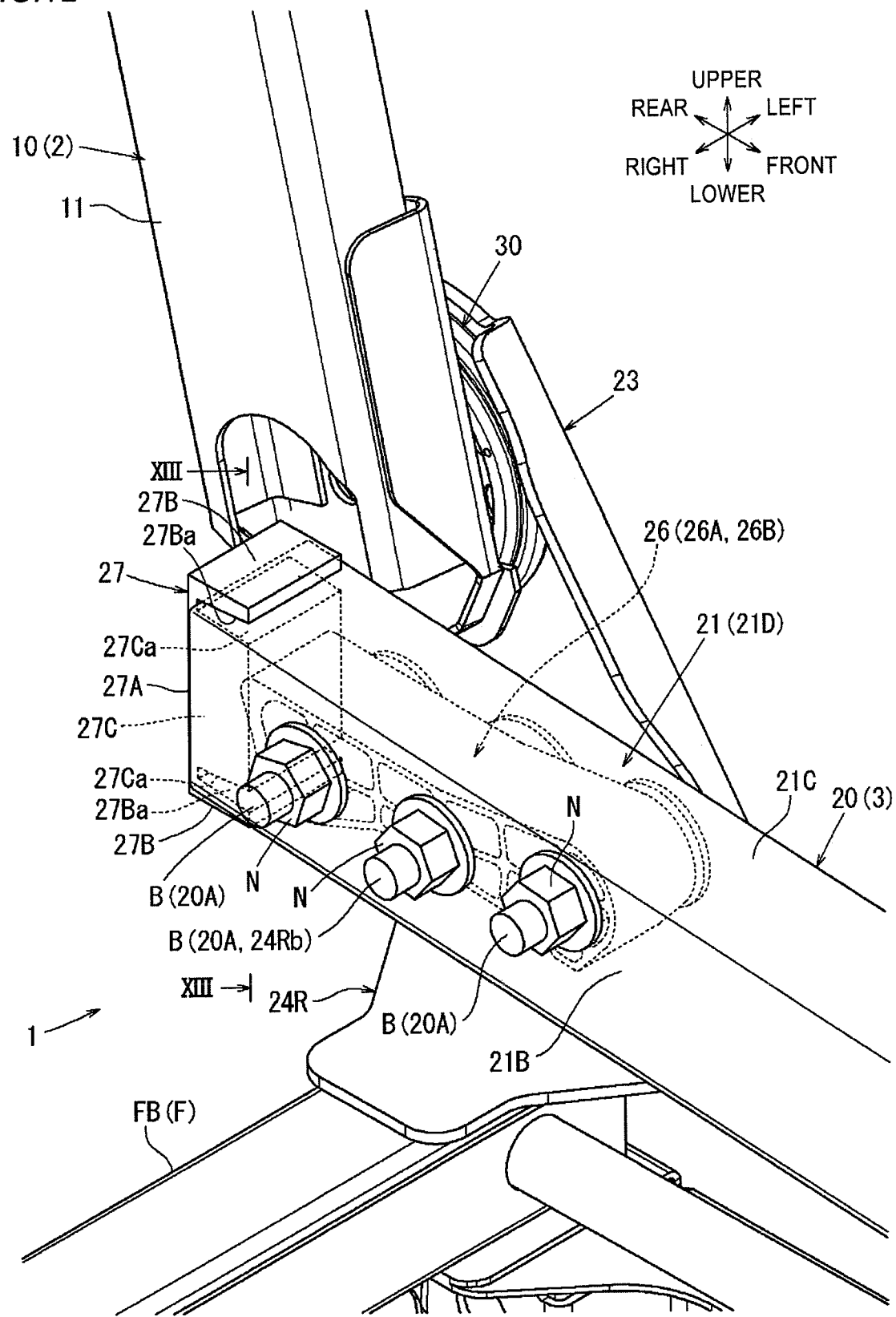
FIG. 12 is an enlarged perspective view showing the attachment portion of the cap.
Figure 13:
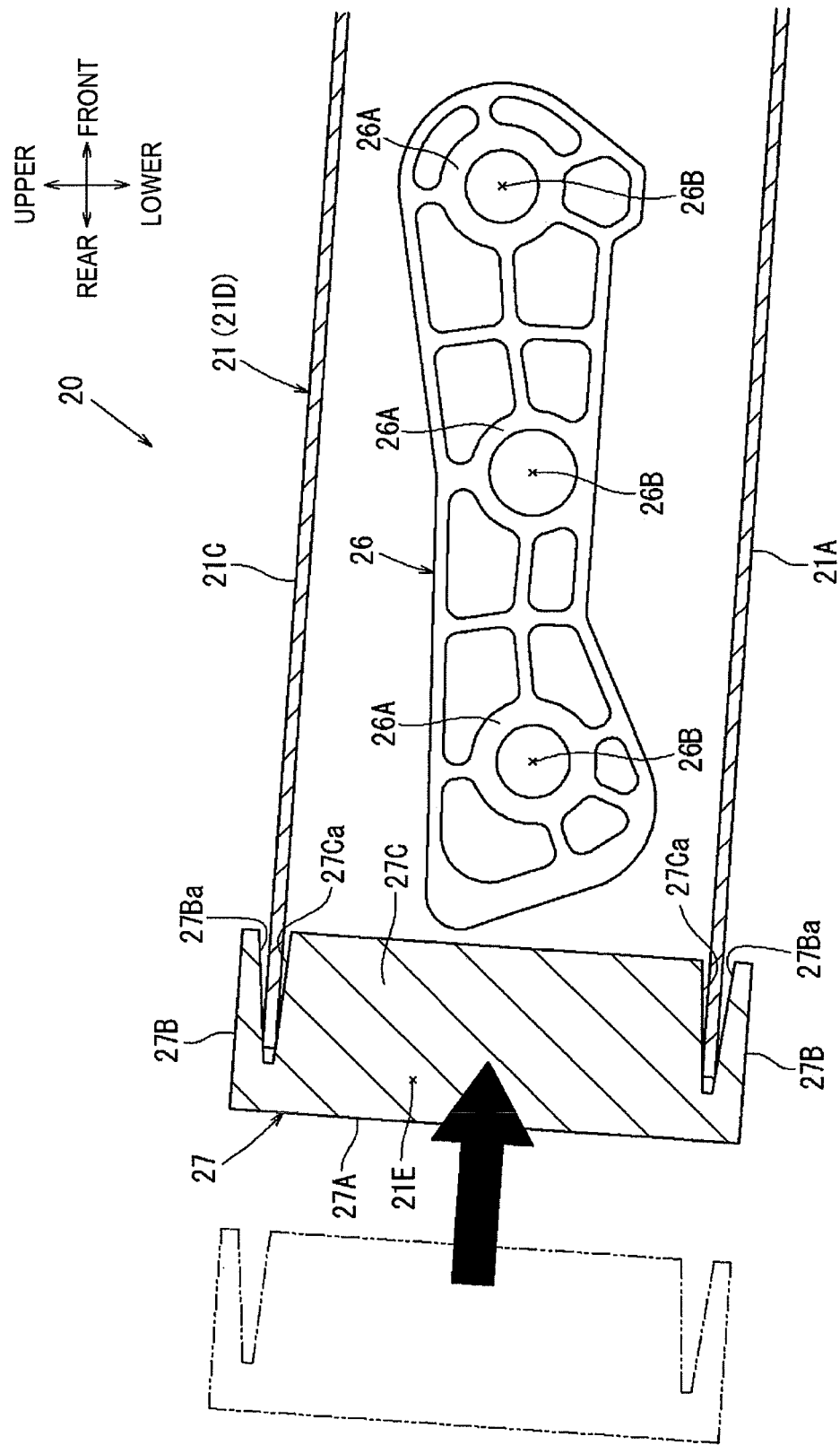
FIG. 13 is a sectional view taken along the line XIII-XIII in FIG. 12.

As shown in FIGS. 11 to 13, a cap 27 for closing the opening portion 21E on the rear end side is assembled to the rear end portion of each lower arm 21 in such a manner that it is press-fitted and integrated therewith from the rear side. Specifically, as shown in FIG. 11, each cap 27 is formed of an aluminum material extruded to have a constant sectional shape in the seat width direction. Each cap 27 has a substantially rectangular plate-like covering portion 27A for covering the opening portion 21E on the rear end side of each lower arm 21, outer peripheral side pressing portions 27B protruding in an eave shape toward the front side from the upper and lower edge portions of the covering portion 27A, and an inner peripheral side pressing portion 27C protruding in a substantially block shape toward the front side from the intermediate portion in a height direction of the covering portion 27A.

The covering portion 27A of each cap 27 is formed in a substantially rectangular plate shape which has a height dimension slightly larger than an outer diameter dimension in the height direction between an upper surface portion 21C and a bottom surface portion 21A of each lower arm 21 and which has a lateral width dimension substantially equal to an inner diameter dimension between the both side surface portions 21B of each lower arm 21. Further, the outer peripheral side pressing portions 27B protruding in an eave shape toward the front side from the upper and lower edge portions of each cap 27 are formed to have a height width which allows the rear end portion of each lower arm 21 to be inserted therebetween in the height direction from the rear side. Here, the upper surface portion 21C and the bottom surface portion 21A of each lower arm 21 correspond to the "facing portions" in the disclosure, respectively.

Specifically, the inner peripheral surfaces of the outer peripheral side pressing portions 27B are formed as inclined surfaces 27Ba in such a manner that the interval therebetween gradually widens toward the front side that is the side of receiving each lower arm 21. In this way, the rear end portion of each lower arm 21 inserted between the outer peripheral side pressing portions 27B can be widely received in the height direction. As shown in FIG. 13, at the region on the leading end side receiving the rear end portion of each lower arm 21, the inclined surfaces 27Ba of the outer peripheral side pressing portions 27B have a shape in which the interval therebetween is wider than the outer diameter dimension in the height direction between the upper surface portion 21C and the bottom surface portion 21A of each lower arm 21. However, the inclined surfaces 27Ba of the outer peripheral side pressing portions 27B are inclined such that the interval therebetween gradually becomes narrower than the outer diameter dimension in the height direction between the upper surface portion 21C and the bottom surface portion 21A of each lower arm 21 toward the direction (rearward direction) receiving the rear end portion of each lower arm 21.

With such a configuration, the rear end portion of each lower arm 21 is inserted between the outer peripheral side pressing portions 27B of each cap 27, so that the outer peripheral side terminals on the rear edge side of the upper surface portion 21C and the bottom surface portion 21A of each lower arm 21 are linearly pressed against the inclined surfaces 27Ba which are the inner peripheral surfaces of the outer peripheral side pressing portions 27B, respectively. Further, when the rear end portion of each lower arm 21 is further press-fitted and inserted between the outer peripheral side pressing portions 27B of each cap 27 from the above state, each cap 27 is integrally fitted into each lower arm 21 in a state where the rear end portion of each lower arm 21 is pushed and pinched between the outer peripheral side pressing portions 27B.

Further, as shown in FIG. 11, the inner peripheral side pressing portion 27C protruding in a substantially block shape toward the front side from the intermediate portion in the height direction of the covering portion 27A of each cap 27 is formed to have an outer peripheral surface shape which can be fitted and inserted into the upper surface portion 21C, the bottom surface portion 21A and the both side surface portions 21B forming the closed sectional portion 21D of each lower arm 21 from the inner peripheral side, respectively. Specifically, in each inner peripheral side pressing portion 27C, right and left side surfaces are formed into a mortar shape such that they can be fitted to the both side surface portions 21B of each lower arm 21 in a state of being widely in surface contact therewith from the inner peripheral side, but upper and lower surfaces are formed as inclined surfaces 27Ca in such a manner that the interval therebetween gradually becomes narrower toward the front side that is the side of receiving each lower arm 21.

As shown in FIG. 13, at the region on the leading end side inserted into the opening portion 21E on the rear end side of each lower arm 21, the inclined surfaces 27Ca of each inner peripheral side pressing portion 27C have a shape in which the interval therebetween is narrower than the inner diameter dimension in the height direction between the upper surface portion 21C and the bottom surface portion 21A of each lower arm 21. However, the inclined surfaces 27Ca of each inner peripheral side pressing portion 27C are inclined such that the interval therebetween gradually becomes wider than the outer diameter dimension in the height direction between the upper surface portion 21C and the bottom surface portion 21A of each lower arm 21 toward the direction (rearward direction) receiving the opening portion 21E on the rear end side of each lower arm 21.

With such a configuration, the inner peripheral side pressing portion 27C of each cap 27 protruding in a block shape is inserted into the opening portion 21E on the rear end side of the lower arm 21 on each side from the rear side, so that the inner peripheral side terminals on the rear edge sides of the upper surface portion 21C and the bottom surface portion 21A of each lower arm 21 are linearly pressed against the inclined surfaces 27Ca which are outer peripheral surfaces on the upper and lower sides of each inner peripheral side pressing portion 27C. Further, when each inner peripheral side pressing portion 27C is further press-fitted and inserted into the opening portion 21E on the rear end side of each lower arm 21 from the above state, each cap 27 is integrally fitted into each lower arm 21 in a state where each inner peripheral side pressing portion 27C is pushed between inner peripheral side terminals on the rear edge sides of the upper surface portion 21C and the bottom surface portion 21A of each lower arm 21.

With the fitting using the press-fitting, each cap 27 is integrally attached to the rear end portion of each lower arm 21 in such a state where the rear edge side terminals of the upper surface portion 21C and the bottom surface portion 21A of each lower arm 21 are pushed and pinched in the height direction by the pair of upper and lower outer peripheral side pressing portions 27B and the central inner peripheral side pressing portion 27C. In this way, the covering portion 27A of each cap 27 is adapted to cover the opening portion 21E on the rear end side of each lower arm 21 from the rear side, and the outer peripheral side pressing portions 27B of each cap 27 protruding from the upper and lower edge portions of the covering portion 27A are adapted to cover the edges of the outer peripheral side terminals on the rear edge sides of the upper surface portion 21C and the bottom surface portion 21A of each lower arm 21 from the outside.

Specifically, each cap 27 is integrally attached to the rear end portion of each lower arm 21 in such a manner that the rear edge side terminals of the upper surface portion 21C and the bottom surface portion 21A of each lower arm 21 are respectively pushed and pinched by the pair of upper and lower outer peripheral side pressing portions 27B and the central inner peripheral side pressing portion 27C over substantially the entire region in the seat width direction from the inner peripheral side and the outer peripheral side, and the both side surface portions 21B of each lower arm 21 abut against the right and left side surfaces of the inner peripheral side pressing portion 27C in a state of being in surface contact therewith over substantially the entire region in the height direction from the inner peripheral side.

With the above attachment, each cap 27 can appropriately close the opening portion 21E on the rear end side of each lower arm 21. Further, when the load of bending moment from the seat back 2 is input to each lower arm 21 as described with reference to FIG. 10, each cap 27 can appropriately suppress the deformation of the rear end portion of each lower arm 21 so that the rear end portion of each lower arm 21 is not stretched or crushed in the height direction.

<Summary>

To summarize the above, the seat 1 of the present embodiment has the following configurations. That is, the vehicle seat (1) includes the frame member (21) whose sectional shape includes the pair of facing portions (21A, 21C) extending in a specific direction (seat front and rear direction). The vehicle seat (1) includes the cap (27) attached to terminals, in the specific direction (seat front and rear direction), of the pair of facing portions (21A, 21C) and extending between the terminals of the pair of facing portions (21A, 21C). The cap (27) includes a pair of pressing portions (27B, 27C) abutting on the terminals of the pair of facing portions (21A, 21C) from at least one of the inner peripheral side or the outer peripheral side and configured to suppress the deformation of each of the terminals toward a side facing another of the terminals or a side opposite thereto.

In this manner, the deformation of the terminals, in the specific direction (seat front and rear direction), of the pair of facing portions (21A, 21C) of the frame member (21) toward the side facing the other terminal or the opposite side can be suppressed by the pressing portions (27B, 27C) of the cap (27), so that the crushing of the terminals of the frame member (21) can be prevented.

Further, each of the pair of pressing portions (27B, 27C) has a both clamping structure in which each of the pair of pressing portions (27B, 27C) abut on each of the terminals of the pair of facing portions (21A, 21C) from both the inner peripheral side and the outer peripheral side to clamp the terminals from both the inner peripheral side and the outer peripheral side. With such a configuration, the deformation of the terminals of the pair of facing portions (21A, 21C) of the frame member (21) toward the side facing the other terminal and the opposite side can be suppressed by the pressing portions (27B, 27C) of the cap (27), and the crushing of the terminals of the frame member (21) can be more appropriately prevented.

Further, at least one of the pair of pressing portions (27B, 27C) has the inclined surface (27Ba, 27Ca) which obliquely abuts on at least one of the terminals of the pair of facing portions (21A, 21C) with respect to the specific direction (seat front and rear direction). With such a configuration, the pressing portions (27B, 27C) of the cap (27) can be attached to the terminal of the pair of facing portions (21A, 21C) in such a manner to more appropriately abut on the terminal from the inner peripheral side or the outer peripheral side.

Further, the pair of facing portions (21A, 21C) are parallel to each other, and the cap (27) has a constant sectional shape in a perpendicular direction (seat width direction) perpendicular to both a facing direction of the pair of facing portions (21A, 21C) and the specific direction (seat front and rear direction). With such a configuration, the cap (27) can be formed by a simple molding method capable of molding a constant sectional shape, such as extrusion molding.

Further, the frame member (21) has a closed sectional shape, and the pair of facing portions (21A, 21C) constitutes a part of the closed sectional shape. With such a configuration, the cap (27) can make it difficult for the opening portion (21E) of the terminal of the frame member (21) having a closed sectional shape to be crushed, and thus, it becomes possible for the frame member (21) having a closed sectional shape to have a structure with high structural strength over the entire area thereof.

Other Embodiments

Although the embodiments of the disclosure have been described using one embodiment, the disclosure can be implemented in various forms other than the above embodiment. For example, the structure of the vehicle seat of the disclosure can be widely applied to the seats provided for various vehicles other than automobiles, such as trains, aircrafts and ships. Further, the structure of the disclosure can be applied not only to a seat for a single person but also a seat for a plurality of passengers such as a bench seat.

Further, the frame member may be a rail member of a slide rail for adjusting the position of the seat in the front and rear direction or a frame member constituting another seat frame, in addition to the lower arm serving as the side frame of the seat cushion previously described in the above embodiment. The frame member may be made of a frame member having an open sectional shape, in addition to the frame member having the closed sectional shape.

Further, the cap may be made of a material such as a resin material or an iron material, in addition to the aluminum material. Further, the pressing portions of the cap may be configured to abut, in pairs, between the terminals of the pair of facing portions in a specific direction only from the inner peripheral side or only from the outer peripheral side. Further, the pressing portions of the cap may straightly abut between the terminals of the pair of facing portions in a specific direction in a surface contact state rather than obliquely abutting between the terminals from the inner peripheral side or the outer peripheral side. Further, the pressing portions of the cap may obliquely abut between the terminals of the pair of facing portions in a specific direction from one of the inner peripheral side and the outer peripheral side and may straightly abut between the terminals in a surface contact state from the other of the inner peripheral side and the outer peripheral side.

Further, the cap may be attached to the frame member using various methods such as bolt fastening, welding and elastic claw fitting, in addition to the integral attachment by press-fitting. Further, the cap may be integrated with a separate member such as the collar described in the above embodiment, and may be attached to the frame member so that the separate member such as the collar integrated with the cap is positioned at a predetermined position. In such a case, the cap may be integrated with the frame member via a structure in which the separate member is coupled to a predetermined position.

The disclosure provides illustrative, non-limiting examples as follows:

According to a first aspect of the disclosure, there is provided a vehicle seat including: a frame member whose sectional shape includes a pair of facing portions extending in a specific direction; and a cap attached to terminals, in the specific direction, of the pair of facing portions and extending between the terminals of the pair of facing portions, wherein the cap includes a pair of pressing portions abutting on the terminals of the pair of facing portions from at least one of an inner peripheral side or an outer peripheral side and configured to suppress deformation of each of the terminals toward a side facing another of the terminals or a side opposite thereto.

According to the first aspect, the deformation of the terminals, in the specific direction, of the pair of facing portions of the frame member toward the side facing the other terminal or the opposite side can be suppressed by the pressing portion of the cap, so that the crushing of the terminals of the frame member can be prevented.

According to a second aspect of the disclosure, there is provided the vehicle seat according to the first aspect, wherein each of the pair of pressing portions has a both clamping structure in which each of the pair of pressing portions abuts on each of the terminals of the pair of facing portions from both the inner peripheral side and the outer peripheral side to clamp the terminals from both the inner peripheral side and the outer peripheral side.

According to the second aspect, the deformation of the terminals of the pair of facing portions of the frame member toward the side facing the other terminal and the opposite side can be suppressed by the pressing portion of the cap, and the crushing of the terminals of the frame member can be more appropriately prevented.

According to a third aspect of the disclosure, there is provided the vehicle seat according to the first or second aspect, wherein at least one of the pair of pressing portions has an inclined surface which obliquely abuts on at least one of the terminals of the pair of facing portions with respect to the specific direction.

According to the third aspect, the pressing portion of the cap can be attached to the terminal of the pair of facing portions in such a manner to more appropriately abut on the terminal from the inner peripheral side or the outer peripheral side.

According to a fourth aspect of the disclosure, there is provided the vehicle seat according to any one of the first to third aspects, wherein the pair of facing portions are parallel to each other, and wherein the cap has a constant sectional shape in a perpendicular direction perpendicular to both a facing direction of the pair of facing portions and the specific direction.

According to the fourth aspect, the cap can be formed by a simple molding method capable of molding a constant sectional shape, such as extrusion molding.

According to a fifth aspect of the disclosure, there is provided the vehicle seat according to any one of the first to fourth aspects, wherein the frame member has a closed sectional shape, and the pair of facing portions constitutes a part of the closed sectional shape.

According to the fifth aspect, the cap can make it difficult for the opening portion of the terminal of the frame member having a closed sectional shape to be crushed, and thus, it becomes possible for the frame member having a closed sectional shape to have a structure with high structural strength over the entire area thereof.

According to a sixth aspect of the disclosure, there is provided a vehicle seat including: a frame member having an opened end, the frame member including: a first portion extending in a longitudinal direction and including a first longitudinal end portion configuring the opened end; and second portion extending in the longitudinal direction and including a second longitudinal end portion configuring the opened end, the second longitudinal end portion facing the first longitudinal end portion; and a cap attached to the first longitudinal end portion and the second longitudinal end portion so as to cover the opened end, wherein the cap includes a first abutting portion abutting on the first longitudinal end portion and a second abutting portion abutting on the second longitudinal end portion, the first abutting portion and the second abutting portion configured to suppress deformation of the first longitudinal end portion and the second longitudinal end portion.

According to a seventh aspect of the disclosure, there is provided the vehicle seat according to the sixth aspect, wherein the first longitudinal end portion has a first surface and a second surface opposite to the first surface, and the second longitudinal end portion has a third surface and a fourth surface opposite to the third surface, and wherein the first abutting portion abuts on both the first surface and the second surface of the first longitudinal end portion, and the second abutting portion abuts on both the third surface and the fourth surface of the second longitudinal end portion.

According to an eighth aspect of the disclosure, there is provided the vehicle seat according to the sixth or seventh aspect, wherein the first abutting portion has a first inclined surface inclined with respect to the longitudinal direction, the first inclined surface coming into contact with the first longitudinal end portion, and wherein the second abutting portion has a second inclined surface inclined with respect to the longitudinal direction, the second inclined surface coming into contact with the second longitudinal end portion.

According to a ninth aspect of the disclosure, there is provided the vehicle seat according to any one of the sixth to eighth aspects, wherein the first portion and the second portion are parallel to each other and face each other in a facing direction, and wherein the cap has a constant sectional shape in a direction perpendicular to both the facing direction and the longitudinal direction.

According to a tenth aspect of the disclosure, there is provided the vehicle seat according to any one of the sixth to ninth aspects, wherein the frame member has a closed sectional shape, and the first portion and the second portion constitute a part of the closed sectional shape.

What is claimed is:

1. A vehicle seat comprising:
a frame member whose sectional shape includes a pair of facing portions extending in a specific direction; and
a cap attached to terminals, in the specific direction, of the pair of facing portions and extending between the terminals of the pair of facing portions,
wherein the cap includes a pair of pressing portions abutting on the terminals of the pair of facing portions from at least one of an inner peripheral side or an outer peripheral side and configured to suppress deformation of each of the terminals toward a side facing another of the terminals or a side opposite thereto, and
wherein each of the pair of pressing portions has a both clamping structure in which each of the pair of pressing portions abuts on each of the terminals of the pair of facing portions from both the inner peripheral side and the outer peripheral side to clamp the terminals from both the inner peripheral side and the outer peripheral side.

2. The vehicle seat according to claim 1,
wherein at least one of the pair of pressing portions has an inclined surface which obliquely abuts on at least one of the terminals of the pair of facing portions with respect to the specific direction.

3. The vehicle seat according to claim 1,
wherein the pair of facing portions are parallel to each other, and
wherein the cap has a constant sectional shape in a perpendicular direction perpendicular to both a facing direction of the pair of facing portions and the specific direction.

4. The vehicle seat according to claim 1,
wherein the frame member has a closed sectional shape, and the pair of facing portions constitutes a part of the closed sectional shape.

5. A vehicle seat comprising:
a frame member having an opened end, the frame member including:
a first portion extending in a longitudinal direction and including a first longitudinal end portion configuring the opened end; and
second portion extending in the longitudinal direction and including a second longitudinal end portion configuring the opened end, the second longitudinal end portion facing the first longitudinal end portion; and
a cap attached to the first longitudinal end portion and the second longitudinal end portion so as to cover the opened end,
wherein the cap includes a first abutting portion abutting on the first longitudinal end portion and a second abutting portion abutting on the second longitudinal end portion, the first abutting portion and the second abutting portion configured to suppress deformation of the first longitudinal end portion and the second longitudinal end portion,
wherein the first longitudinal end portion has a first surface and a second surface opposite to the first surface, and the second longitudinal end portion has a third surface and a fourth surface opposite to the third surface, and
wherein the first abutting portion abuts on both the first surface and the second surface of the first longitudinal end portion, and the second abutting portion abuts on both the third surface and the fourth surface of the second longitudinal end portion.

6. The vehicle seat according to claim 5,
wherein the first abutting portion has a first inclined surface inclined with respect to the longitudinal direction, the first inclined surface coming into contact with the first longitudinal end portion, and
wherein the second abutting portion has a second inclined surface inclined with respect to the longitudinal direction, the second inclined surface coming into contact with the second longitudinal end portion.

7. The vehicle seat according to claim 5,
wherein the first portion and the second portion are parallel to each other and face each other in a facing direction, and
wherein the cap has a constant sectional shape in a direction perpendicular to both the facing direction and the longitudinal direction.

8. The vehicle seat according to claim 5,
wherein the frame member has a closed sectional shape, and the first portion and the second portion constitute a part of the closed sectional shape.

* * * * *